US012767016B2

(12) United States Patent
Lin et al.

(10) Patent No.: US 12,767,016 B2
(45) Date of Patent: Oct. 20, 2026

(54) CHILD SAFETY SEAT

(71) Applicants: Jiangjuan Lin, Ningbo (CN); Huanle Xia, Ningbo (CN)

(72) Inventors: Jiangjuan Lin, Ningbo (CN); Huanle Xia, Ningbo (CN)

(73) Assignee: NINGBO WELLDON INFANT AND CHILD SAFETY TECHNOLOGY CO., LTD., Ningbo (CN)

(*) Notice: Subject to any disclaimer, the term of this patent is extended or adjusted under 35 U.S.C. 154(b) by 188 days.

(21) Appl. No.: 18/805,584

(22) Filed: Aug. 15, 2024

(65) Prior Publication Data

US 2024/0399941 A1 Dec. 5, 2024

Related U.S. Application Data

(63) Continuation of application No. PCT/CN2023/081016, filed on Mar. 13, 2023.

(51) Int. Cl.

*B60N 2/28* (2006.01)
*B60N 2/02* (2006.01)
*B60N 2/26* (2006.01)

(52) U.S. Cl.

CPC ....... *B60N 2/2875* (2013.01); *B60N 2/02253* (2023.08); *B60N 2/266* (2023.08); *B60N 2/2821* (2013.01)

(58) Field of Classification Search

CPC .. B60N 2/2875; B60N 2/2869; B60N 2/2821; B60N 2/2824; B60N 2/2887
USPC .......................................... 297/256.1, 256.13
See application file for complete search history.

(56) References Cited

U.S. PATENT DOCUMENTS

| | | | | |
|---|---|---|---|---|
| 4,709,960 A | 12/1987 | Launes | | |
| 7,073,859 B1 | 7/2006 | Wilson | | |
| 2001/0011839 A1 * | 8/2001 | Mori | B60N 2/2875 | 297/217.2 |

(Continued)

FOREIGN PATENT DOCUMENTS

| | | |
|---|---|---|
| CN | 103738206 A | 4/2014 |
| CN | 109398181 A | 3/2019 |

(Continued)

OTHER PUBLICATIONS

International Search Report for PCT Application No. PCT/CN2023/081016.

*Primary Examiner* — Alfred J Wujciak
(74) *Attorney, Agent, or Firm* — JEEN IP LAW, LLC

(57) ABSTRACT

The present invention provides a child safety seat. The pitching angle adjustment of the child safety seat is achieved through the angle adjustment mechanism. The connecting rod is connected to the driving mechanism, and the shaft sleeve sleeving the connecting rod is driven by the motor. The gears are mounted at the two ends of the shaft sleeve, and the gears are driven by the shaft sleeve to move on the rack. The rack is mounted on the base plate, so that the seat body can adjust the angle on the base plate. The connecting rod and the seat frame form the fixed supporting structure, so that the stability of angle adjustment is better. By the arrangement of the protective device on the seat portion, the probability of accidentally injuring a child during the turning of the seat body is reduced, and the safety of use is improved.

10 Claims, 6 Drawing Sheets

(56) References Cited

U.S. PATENT DOCUMENTS

| | | | | |
|---|---|---|---|---|
| 2003/0160486 | A1 * | 8/2003 | Dukes | B60N 2/02246 297/256.13 |
| 2016/0304004 | A1 * | 10/2016 | Sandbothe | A47D 13/10 |
| 2023/0119709 | A1 * | 4/2023 | Wang | B60N 2/0277 297/256.13 |
| 2024/0343165 | A1 * | 10/2024 | Cheng | B60N 2/10 |

FOREIGN PATENT DOCUMENTS

| | | | |
|---|---|---|---|
| CN | 213082970 | U | 4/2021 |
| CN | 214240524 | U | 9/2021 |
| CN | 114312509 | A | 4/2022 |
| CN | 217099752 | U | 8/2022 |
| WO | 2023174199 | A1 | 9/2023 |

* cited by examiner

CHILD SAFETY SEAT

CROSS-REFERENCE TO RELATED APPLICATIONS

This application is a continuation of International Application No. PCT/CN2023/081016, filed on Mar. 13, 2023, the entire contents of which are incorporated herein by reference.

TECHNICAL FIELD

The present disclosure relates to the technical field of safety seats, and in particular, to a child safety seat.

BACKGROUND OF THE INVENTION

An automotive child safety seat is a seat that is designed specifically for children of different ages, mounted in an automobile, and can effectively improve the safety of children on the automobile. With the gradual improvement of the awareness of vehicle safety, the child safety seats have been widely used. However, the traditional child safety seats are fixedly mounted in vehicles. In actual use, due to different ages, different bodily forms, different sleep states, and different requirements for comfort levels of usage, the safety seat often needs to be adjusted according to an inclination angle.

At present, there have been already some related technical solutions for automatically adjusting an inclination angle of a child safety seat in the prior art. For example, the invention patent No. CN108128221A discloses a child safety seat and a seat back pitching angle adjustment mechanism. The child safety seat includes a base and a seat body; the seat body includes a seat and a seat back which are integrated; an arc-shaped track extending towards the seat back is arranged at a bottom of the seat; an arc-shaped fixed frame capable of sliding in the arc-shaped track is arranged in the arc-shaped track; and a fixed shaft shafted to the base is arranged at a bottom of the arc-shaped fixed frame. A pitching angle of the seat back is achieved by moving a position of the arc-shaped fixed frame in the arc-shaped track. The child safety seat has the advantages that the fixed shaft shafted to the base is arranged at the bottom of the arc-shaped fixed frame; the arc-shaped fixed frame is in the arc-shaped track; and the pitching angle of the seat back is achieved by moving the arc-shaped fixed frame in the arc-shaped track, namely, by adjusting the position of the arc-shaped fixed frame on the seat back. An adjustment device in this technical solution is arranged on an outer side of the seat back, so that the entire seat body has poor structural compactness and poor supportability. During use in a vehicle, since a space in the vehicle is small, a limb of a child is easily pinched when the child safety seat is rotated to an angle. In the rotating process, the safety of the child cannot be guaranteed. There is a problem of the safety of use, From the content disclosed in the prior art, it can be seen that the child safety seat with the automatic adjustment function for the inclination angle has the problems that it easily pinches the legs, has poor safety, is inconvenient to use, and the like.

SUMMARY OF THE INVENTION

For the problems that a child safety seat with an automatic adjustment function for an inclination angle in the prior art easily pinches the legs, has poor safety, and is inconvenient to use, the present disclosure provides a child safety seat which has the advantages of anti-pinching effect, good safety, and convenience in use.

One concept of the present disclosure is to provide a child safety seat, specifically including a seat body, wherein the seat body is provided with an angle adjustment device; the angle adjustment device is configured to electrically adjust a pitching angle of the seat body; the seat body includes a seat back portion and a seat portion; and the angle adjustment device is arranged at the seat portion.

Further, the angle adjustment device includes a base plate, a driving mechanism, and gears; the base plate is shaped to fit the seat portion; the base plate is configured to support the seat body;

the base plate is provided with a connecting plate; the seat portion is slidably connected to the base plate through the connecting plate; the seat portion is provided with a seat frame; the seat frame includes a connecting rod; the connecting rod is fixedly connected to the seat frame; the connecting plate is provided with a limiting slot; the connecting rod slidably cooperates with the limiting slot; the gears are rotationally connected to the connecting rod; the driving mechanism is in driving connection to the gears; the base plate is provided with a rack that cooperates with the gears; and the driving mechanism drives the gears to enable the seat body to slide.

In an actual use process, pitching angle adjustment is a common function of the child safety seat. However, in the prior art, most child safety seats are still manually adjusted, which is laborious, time-consuming, and inconvenient. In this technical solution, the pitching angle of the seat body is electrically adjusted through the angle adjustment device. Electric adjustment is more time-saving and labor-saving than manual adjustment. Moreover, by the arrangement of the base plate and the driving mechanism, the base plate and the seat portion are adapted to support the seat body, so that the seat body can perform the pitching angle adjustment on the base plate through the driving mechanism. The entire angle adjustment device is arranged at the seat portion and is closer to the center of gravity of the seat body, so that the stability and supportability during the angle adjustment are better. In this technical solution, the connecting plate is basically arc-shaped and is mounted in conjunction with the seat body. Through the slidable connection between the connecting plate and the seat body, the entire angle adjustment device has better structural stability. By the arrangement of the limiting slot to limit an adjustment range of the pitching angle of the seat body, a motor drives the connecting rod to slide in the limiting slot, thereby driving the seat body to achieve the angle adjustment. The structure is compact, and the stability is better.

In another aspect, in this technical solution, the seat body is supported by the seat frame, and the connecting rod is connected to the driving mechanism. The connecting rod is fixedly connected to the seat frame, and the driving mechanism drives the seat frame, thereby driving the entire seat body. Compared with the independently arranged connecting rod in the prior art, the connecting rod is higher in both stability and supportability. A rotating structure in the prior art is greatly worn, and the strength of a connecting structure is low, Still further, a shaft sleeve is mounted on the connecting rod; the gears are arranged at two ends of the shaft sleeve; the shaft sleeve is connected to the motor; and a length of the shaft sleeve is less than a length of the connecting rod. By the arrangement of the shaft sleeve and the gears, the rack is arranged on the base plate and driven by the motor, so that the gears move on the rack. The shaft sleeve is driven by the motor to rotate on the connecting rod, so that the connecting rod can be fixedly connected to the seat frame, thereby forming a stable supporting structure, making the child safety seat more stable during the angle adjustment. Since the length of the shaft sleeve is less than the length of the connecting rod, the entire driving structure is arranged in the middle of the seat portion, and the entire device is better in structural stability.

Still further, positioning slots are provided at end portions of the shaft sleeve; protrusions are arranged on inner walls of the gears; the protrusions cooperate with the positioning slots to limit the gears at two ends of the shaft sleeve; a speed reduction mechanism is arranged between the shaft sleeve and the motor; the speed reduction mechanism is configured to increase a torque; a motor box is further mounted on the shaft sleeve; the motor box is configured to mount the motor; a through hole is provided on the motor box; the through hole is shaped to fit the shaft sleeve; and the through hole is configured to sleeve the motor box on the shaft sleeve.

In this technical solution, the gears directly sleeve the two ends of the shaft sleeve. It is conveniently and quickly mounted. The shaft sleeve rotates under the action of the motor, and the gears at the two ends of the shaft sleeve rotate under the corresponding force. Through the positioning slots at the end portions of the shaft sleeve and the protrusions on the inner walls of the gears, the gears are prevented from slipping on the shaft sleeve, and the structural integrity is better, which greatly improves the rotation efficiency. In an actual use process, a large torque is required when the toothed ring is driven to drive the seat body to rotate. In this technical solution, since the speed reduction mechanism, such as a gear set, is arranged between the shaft sleeve and the motor, the torque is greatly increased, and the low-power motor can drive the shaft sleeve and the toothed ring. This can reduce the cost and can further reduce the size. The volume of the child safety seat needs to be adapted to a space in a vehicle. Especially the child safety seat is fixed in a rear seat of the vehicle, and the rear seat is narrow. Therefore, the seat back portion of the seat body needs to be made thinner. In this technical solution, the motor box sleeves the shaft sleeve, so that the motor is mounted on the seat portion, avoiding the impact on the volume of the seat back portion and greatly increasing the space utilization rate.

The present disclosure may further provide a child safety seat, including a seat body. The seat body is provided with an angle adjustment device; and the angle adjustment device is configured to electrically adjust a pitching angle of the seat body.

Further, the seat body includes a seat back portion and a seat portion; the angle adjustment device is arranged on the seat portion; the angle adjustment device includes a base plate; the base plate is shaped to fit the seat portion; the base plate is configured to support the seat body; the angle adjustment device further includes a driving mechanism; the driving mechanism is configured to drive the seat body to move on the base plate;

the seat portion is provided with a protective device; the protective device is configured to prevent the legs from being pinched; the protective device includes a sensor and a controller; and during a pitching angle adjustment process, when the sensor detects the legs are being pinched by the seat body, the controller is triggered to control the angle adjustment device to stop and/or move back.

In actual daily use, due to a limited space in a vehicle, especially after the child safety seat is mounted in the rear seat, an improper operation can easily pinch the legs of a child during the adjustment of the pitching angle of the child safety seat, resulting in low safety of use. In this technical solution, during the use of the angle adjustment device, the protective device senses a change in the seat portion. When the change reaches a set value of the protective device, the protective device controls the angle adjustment device to stop rotating or to rotates to its original angle.

Still further, a connecting plate is arranged on the base plate; the connecting plate passes through the seat body; the seat body is slidably connected to the connecting plate; the seat body is provided with a seat frame; the seat frame includes a connecting rod; the connecting rod is slidably connected to the connecting plate; and the driving mechanism drives the seat body through the seat frame.

Still further, a limiting slot is provided on the connecting plate; the driving mechanism includes a motor; the connecting rod slides in the limiting slot through the motor; a shaft sleeve is mounted on the connecting rod; gears are arranged at two ends of the shaft sleeve; an output end of the motor is connected to the gears; the base plate is provided with a rack that is matched with the gears; the shaft sleeve is connected to the motor; and the motor drives the shaft sleeve to enable the gears to move on the rack.

Still further, positioning slots are provided at end portions of the shaft sleeve; protrusions are arranged on inner walls of the gears; the protrusions cooperate with the positioning slots to limit the gears at two ends of the shaft sleeve; a speed reduction mechanism is arranged between the shaft sleeve and the motor; the speed reduction mechanism is configured to increase a torque; a motor box is further mounted on the shaft sleeve; the motor box is configured to mount the motor; a through hole is provided on the motor box; the through hole is shaped to fit the shaft sleeve; and the through hole is configured to sleeve the motor box on the shaft sleeve.

Still further, another concept of the present disclosure is that the seat body is further provided with a sensing device; the sensing device is configured to sense an empty state of the seat body; and when the sensing device senses that the seat body is not empty, the protective device is activated. By the arrangement of the sensing device configured o sense whether there is a child in the seat body. When sensing device senses that the seat body is not empty, the protective device is activated to prevent energy waste caused by activation of an empty seat.

In some implementations, the protective device is arranged at a leg placement end of the seat body; and the protective device is triggered by sensing a change in pressure on the leg placement end.

Still further, the protective device is a pressure sensor.

In actual use, one end of the seat body is a headrest portion, and the other end is the leg placement end for placing the legs. During the turning of the seat body, when the legs of a child approach or move away from the leg placement end, the leg placement end senses a pressure change. Especially during the adjustment of the pitching angle, a larger elevation angle indicates that the legs are closer to the leg placement end and the pressure sensed by the leg placement end is higher. Moreover, if the legs are closer to a front adult seat, and the seat body continues to turn, the legs are easily pinched. The protective device is arranged at the leg placement end. When sensing that the pressure reaches the set value, the protective device is triggered to control the seat body to stop turning. This greatly improves the safety of use.

And/or, in some implementations, the protective device is connected to the driving mechanism; and the protective device is triggered by sensing a change in current of the driving mechanism.

Still further, the protective device is a current sensor.

In actual use, when a child sits in the safety seat, the child will turn along with the seat body. The force sensed by the seat body during the turning is different, and the force exerted by the driving mechanism on the seat body is also different. At this time, the current of the driving mechanism changes. In this technical solution, the protective device configured to sense the change in the current of the driving mechanism is provided. When the change in the current reaches a set value, the protective device is triggered to control the seat body to no longer turn, which ensures the safety of the child sitting in the safety seat.

The present disclosure provides a child safety seat. The pitching angle adjustment of the child safety seat is achieved through the angle adjustment mechanism. The connecting rod is connected to the driving mechanism, and the shaft sleeve sleeving the connecting rod is driven by the motor. The gears are mounted at the two ends of the shaft sleeve, and the gears are driven by the shaft sleeve to move on the rack. The rack is mounted on the base plate, so that the seat body can adjust the angle on the base plate. The connecting rod and the seat frame form the fixed supporting structure, so that the stability of angle adjustment is better. By the arrangement of the protective device on the seat portion, the probability of accidentally injuring a child during the turning of the seat body is reduced, and the safety of use is improved. By the arrangement of the sensing device configured to activate the protective device after detecting that the seat body is not empty, the energy waste caused by empty seat protection is prevented. The child safety seat provided in the present disclosure has the advantages of compact structure, good supportability, and high safety of use.

BRIEF DESCRIPTION OF DRAWINGS

The present disclosure is further described below in detail in combination with the accompanying drawings and embodiments. These drawings are not necessarily drawn to scale. It should be understood that these drawings only describe some implementation modes of the present disclosure, and should not be regarded as limiting the scope of the present disclosure.

DETAILED DESCRIPTION OF THE INVENTION

The present disclosure will be explained in detail below in conjunction with the accompanying drawings 1 to 7.

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

Embodiment 1

Figure 1:
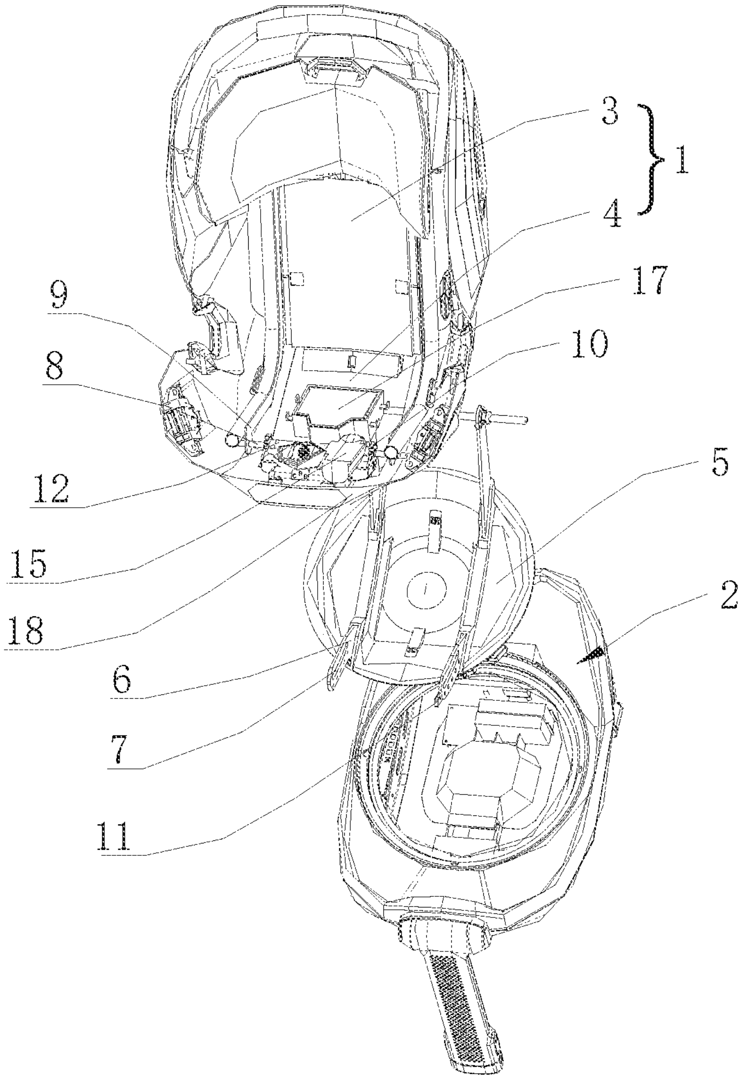
FIG. 1 is an exploded diagram of a child safety seat according to the present disclosure.
Figure 2:
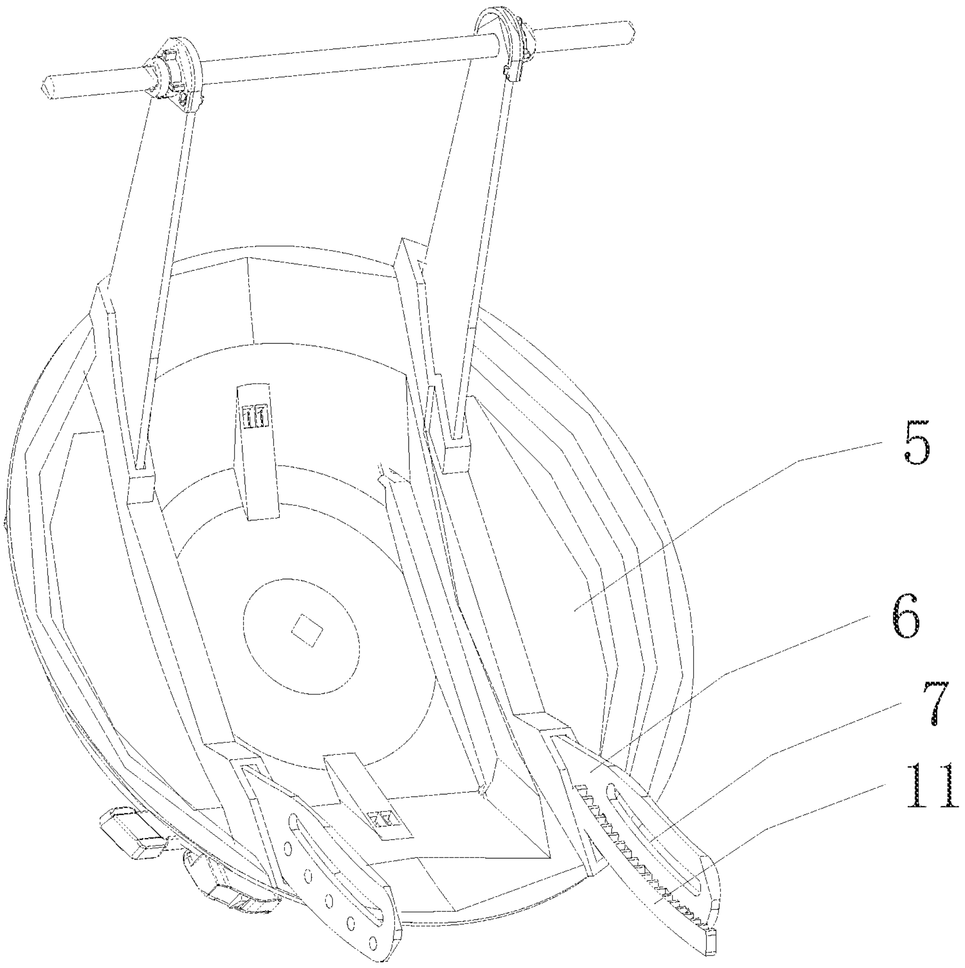
FIG. 2 is a schematic structural diagram of a base plate in the present disclosure.
Figure 3:
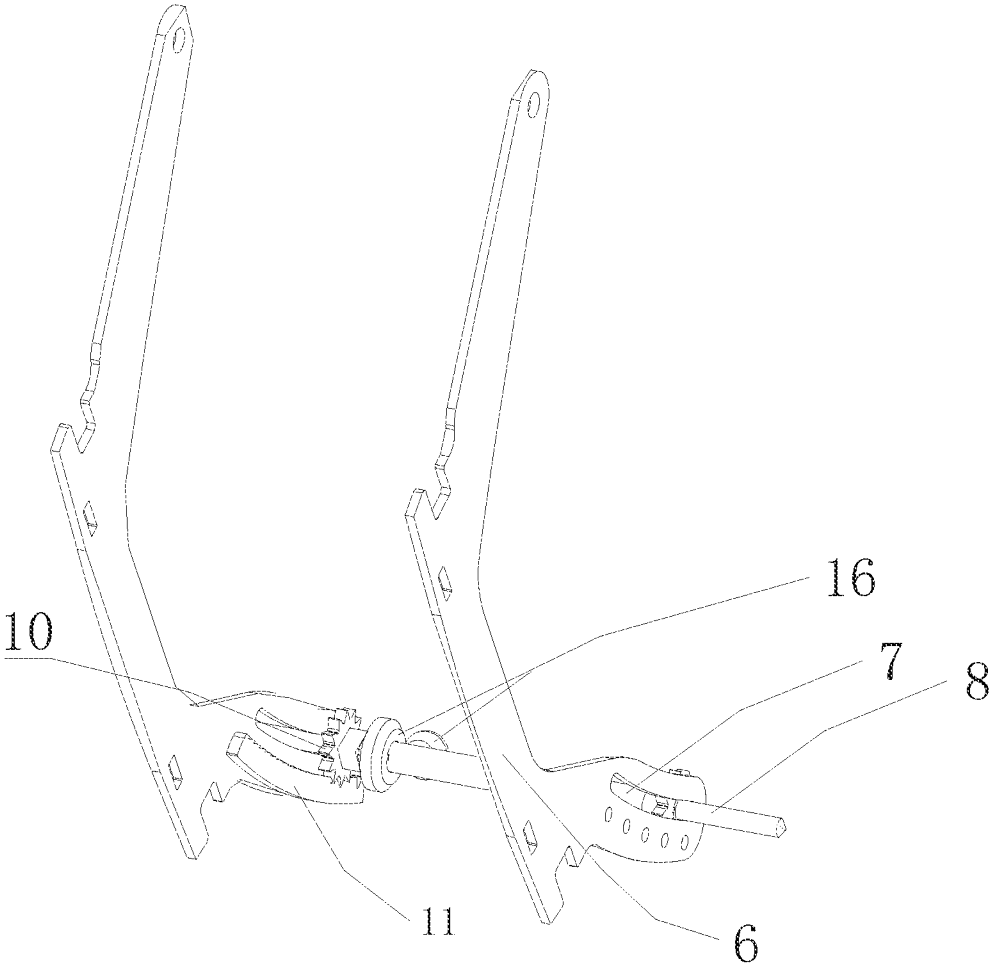
FIG. 3 is a partially structural diagram of a driving mechanism in the present disclosure.

As shown in FIG. 1, this embodiment provides a child safety seat, specifically including a seat body 1 and a base 2; the seat body 1 is mounted on the base 2; the base 2 is configured to fix the child safety seat in a vehicle; the seat body 1 includes a seat back portion 3 and a seat portion 4; the seat portion 4 is provided with an angle adjustment device; the angle adjustment device includes a base plate 5 and a driving mechanism; the base plate 5 is disc-shaped; the base plate 5 and a bottom of the seat portion 4 are adapted to support the seat body 1; the center of gravity of the seat body 1 falls onto the base plate 5; the disc-shaped base plate 5 is mounted between the seat body 1 and the base 2; the seat body 1 can automatically adjust a pitching angle on the base plate 5 through the driving mechanism; the entire angle adjustment device is arranged at the seat portion 4 and is closer to the center of gravity of the seat body 1, so that the seat body 1 has good stability of rotation.

Further, two connecting plates 6 are symmetrically arranged on the base plate 5. The connecting plates 6 are basically arc-shaped, which are adapted to the shape of the seat body 1. The connecting plates 6 pass through the seat portion 4 of the seat body 1; the base plate 5 is slidably connected to the seat portion 4 through the connecting plates 6; limiting slots 7 are provided on the connecting plates 6 to limit an adjustment range of the pitching angle of the seat body 1; the seat body 1 is provided with a seat frame 9; the seat frame 9 is connected with a seat back portion 3; the seat frame 9 includes a connecting rod 8; the connecting rod 8 is slidably connected to the connecting plates 6; the driving mechanism includes a motor; two ends of the connecting rod 8 are respectively arranged in the limiting slots 7 of the two connecting plates 6 in a penetrating manner; the limiting slots 7 are waist-shaped slots; the connecting rod 8 is connected to the driving mechanism; and the connecting rod 8 slide in the limiting slots 7 through the motor, thereby driving the seat body 1 to adjust the pitching angle.

Still further, a shaft sleeve 12 sleeves the connecting rod 8; the shaft sleeve 12 is provided with an inner hole to mount the connecting rod 8; the shape of the inner hole is matched with the shape of the connecting rod 8; gears 10 are respectively mounted at two ends of the shaft sleeve 12; the shaft sleeve 12 is connected to the motor; the motor drives the gears 10 to move on the rack 11 by driving the shaft sleeve 12; a length of the shaft sleeve 12 is less than a length of the connecting rod 8; the connecting rod 8 can be fixedly connected to the seat frame 9 to form a stable supporting structure; and the entire motion mechanism is located between the connecting plates 6, so that the entire driving structure is arranged in the middle of the seat portion 4, and the stability is good.

Figure 4:
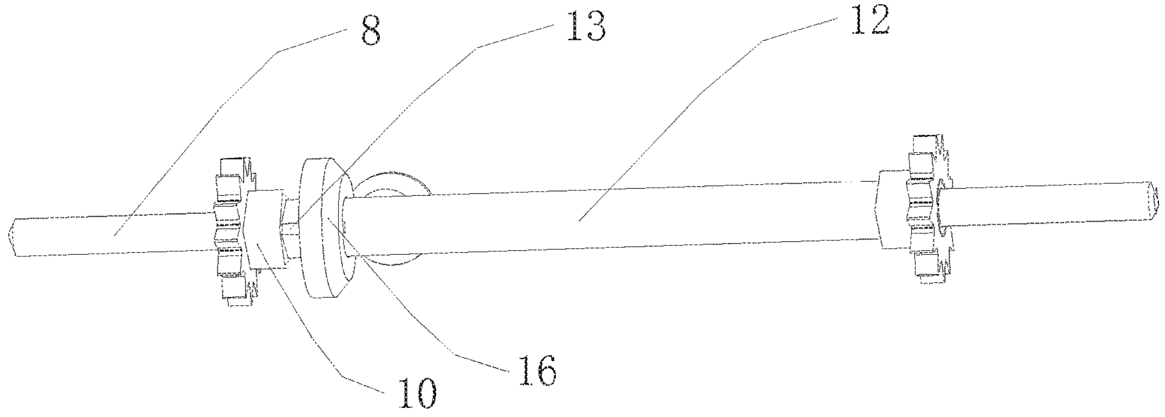
FIG. 4 is a partially structural diagram of Embodiment 2 in the present disclosure.
Figure 5:
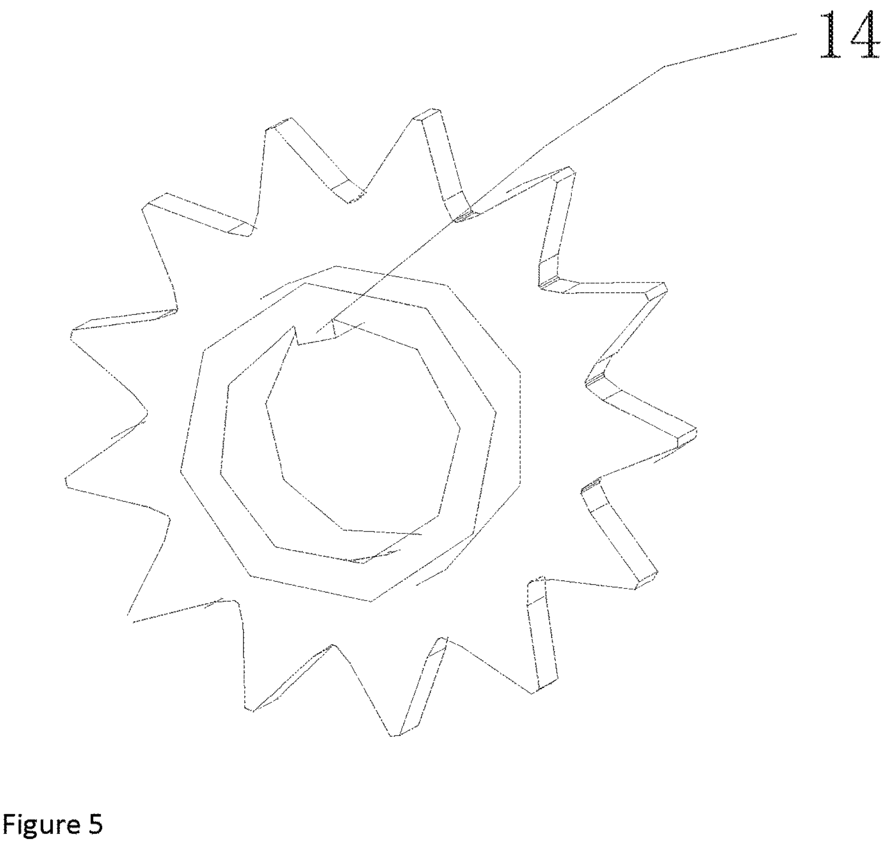
FIG. 5 is a schematic structural diagram of a toothed ring in the present disclosure.

Still further, as shown in FIG. 4, positioning slots 13 are provided at an end portions of the shaft sleeve 12; protrusions 14 are arranged on inner walls of the gears 10; the protrusions 14 cooperate with the positioning slots 13 to limit the gears 10 at the two ends of the shaft sleeve 12; the positioning slots 13 are long strips with openings in end portions, so that the gears 10 are aligned with the positioning slots 13 through the protrusions 14 for quick mounting; and the protrusions 14 and the positioning slots 13 can prevent slippage between the gears 10 and the shaft sleeve 12 to affect the rotation efficiency. A motor box 15 is further mounted on the shaft sleeve 12; the motor box 15 is configured to place the motor; a through hole is provided on the motor box 15; the motor box 15 sleeves the shaft sleeve 12 through the through hole, so that the motor is mounted at the seat portion 4; and during mounting, the volume of the seat body 1 will not increase. A speed reduction mechanism 16 is arranged between the motor and the shaft sleeve 12 to increase a torque. In this embodiment, the speed reduction mechanism 16 provided is formed by meshing the two conical gears 10. One conical gear 10 is connected to an output shaft of the motor, and the other conical gear 10 sleeves the shaft sleeve 12. The protrusions 14 are arranged on the inner walls of the conical gears 10 sleeving the shaft sleeve 12 and are mounted in the positioning slots 13 of the shaft sleeve 12. The torque is increased through the speed reduction mechanism 16, so that the low-power motor can also drive the seat body 1 to move. This saves the cost, reduces the size of the motor, and saves the mounting space.

In another aspect, in this embodiment, the shaft sleeve 12 can be basically circular. The circular shaft sleeve 12 needs to fix the gears 10 through the positioning slots 13. The shaft sleeve 12 can be square, rectangular, and in another polygonal shape. The polygonal shaft sleeve 12 does not need to be provided with the positioning slots 13. The positioning and anti-slippage purpose can be achieved by changing sleeving holes of the gears 10 to be matched with the basic shape of the shaft sleeve 12. The shaft sleeve is convenient to mount and use.

Embodiment 2

As shown in FIG. 1 to FIG. 5, this embodiment provides a child safety seat, including a seat body 1 and a base 2; the seat body 1 is mounted on the base 2; the base 2 is configured to fix the child safety seat in a vehicle; the seat body 1 includes a seat back portion 3 and a seat portion 4; the seat portion 4 is provided with an angle adjustment device; the angle adjustment device includes a base plate 5 and a driving mechanism; the base plate 5 is disc-shaped; the base plate 5 and a bottom of the seat portion 4 are adapted to support the seat body 1; the center of gravity of the seat body 1 falls onto the base plate 5; the disc-shaped base plate 5 is mounted between the seat body 1 and the base 2; the seat body 1 can automatically adjust a pitching angle on the base plate 5 through the driving mechanism; the entire angle adjustment device is arranged at the seat portion 4 and is closer to the center of gravity of the seat body 1, so that the seat body 1 has good stability of rotation.

The seat body 1 is provided with a protective device 18. The angle adjustment device is configured to electrically adjust a pitching angle of the seat body 1. The protective device 18 is configured to prevent the legs from being pinched. During use of the angle adjustment device, the protective device 18 includes a sensor 181 and a controller 182. During a pitching angle adjustment process, when the sensor 181 detects the legs are being pinched by the seat body, the controller 182 is triggered to control the angle adjustment device to stop rotating or to rotate to its original angle. It prevents the seat body 1 from accidentally injure the limbs of a child during turning.

Two connecting plates 6 are symmetrically arranged on the base plate 5. The connecting plates 6 are basically arc-shaped, which are adapted to the shape of the seat body 1. The connecting plates 6 pass through the seat portion 4 of the seat body 1; the base plate 5 is slidably connected to the seat body 1 through the connecting plates 6; limiting slots 7 are provided on the connecting plates 6 to limit an adjustment range of the pitching angle of the seat body 1; the seat body 1 is provided with a seat frame 9; the seat frame 9 includes a connecting rod 8; the connecting rod 8 is slidably connected to the connecting plates 6; the driving mechanism includes a motor; two ends of the connecting rod 8 are respectively arranged in the limiting slots 7 of the two connecting plates 6 in a penetrating manner; and the limiting slots 7 are waist-shaped slots. The connecting rod 8 is connected to the driving mechanism; and the connecting rod 8 slide in the limiting slots 7 through the motor, thereby driving the seat body 1 to adjust the pitching angle. A shaft sleeve 12 sleeves the connecting rod 8; the shaft sleeve 12 is provided with an inner hole to mount the connecting rod 8; the shape of the inner hole is matched with the shape of the connecting rod 8; gears 10 are respectively mounted at two ends of the shaft sleeve 12; the shaft sleeve 12 is connected to the motor; the motor drives the gears 10 to move on the rack 11 by driving the shaft sleeve 12; a length of the shaft sleeve 12 is less than a length of the connecting rod 8; the connecting rod 8 can be fixedly connected to the seat frame 9 to form a stable supporting structure; and the entire motion mechanism is located between the connecting plates 6, so that the entire driving structure is arranged in the middle of the seat portion 4, and the stability is good. As shown in FIG. 4, positioning slots 13 are provided at an end portions of the shaft sleeve 12; protrusions 14 are arranged on inner walls of the gears 10; the protrusions 14 cooperate with the positioning slots 13 to limit the gears 10 at the two ends of the shaft sleeve 12; the positioning slots 13 are long strips with openings in end portions, so that the gears 10 are aligned with the positioning slots 13 through the protrusions 14 for quick mounting; and the protrusions 14 and the positioning slots 13 can prevent slippage between the gears 10 and the shaft sleeve 12 to affect the rotation efficiency. A motor box 15 is further mounted on the shaft sleeve 12; the motor box 15 is configured to place the motor; a through hole is provided on the motor box 15; the motor box 15 sleeves the shaft sleeve 12 through the through hole, so that the motor is mounted at the seat portion 4; and during mounting, the volume of the seat body 1 will not increase. A speed reduction mechanism 16 is arranged between the motor and the shaft sleeve 12 to increase a torque. In this embodiment, the speed reduction mechanism 16 provided is formed by meshing the two conical gears 10. One conical gear 10 is connected to an output shaft of the motor, and the other conical gear 10 sleeves the shaft sleeve 12. The protrusions 14 are arranged on the inner walls of the conical gears 10 sleeving the shaft sleeve 12 and are mounted in the positioning slots 13 of the shaft sleeve 12. The torque is increased through the speed reduction mechanism 16, so that the low-power motor can also drive the seat body 1 to move. This saves the cost, reduces the size of the motor, and saves the mounting space.

In another aspect, in this embodiment, the shaft sleeve 12 can be basically circular. The circular shaft sleeve 12 needs to fix the gears 10 through the positioning slots 13. The shaft sleeve 12 can be square, rectangular, and in another polygonal shape. The polygonal shaft sleeve 12 does not need to be provided with the positioning slots 13. The positioning and anti-slippage purpose can be achieved by changing sleeving holes of the gears 10 to be matched with the basic shape of the shaft sleeve 12. The shaft sleeve is convenient to mount and use.

Embodiment 3

Figure 6:
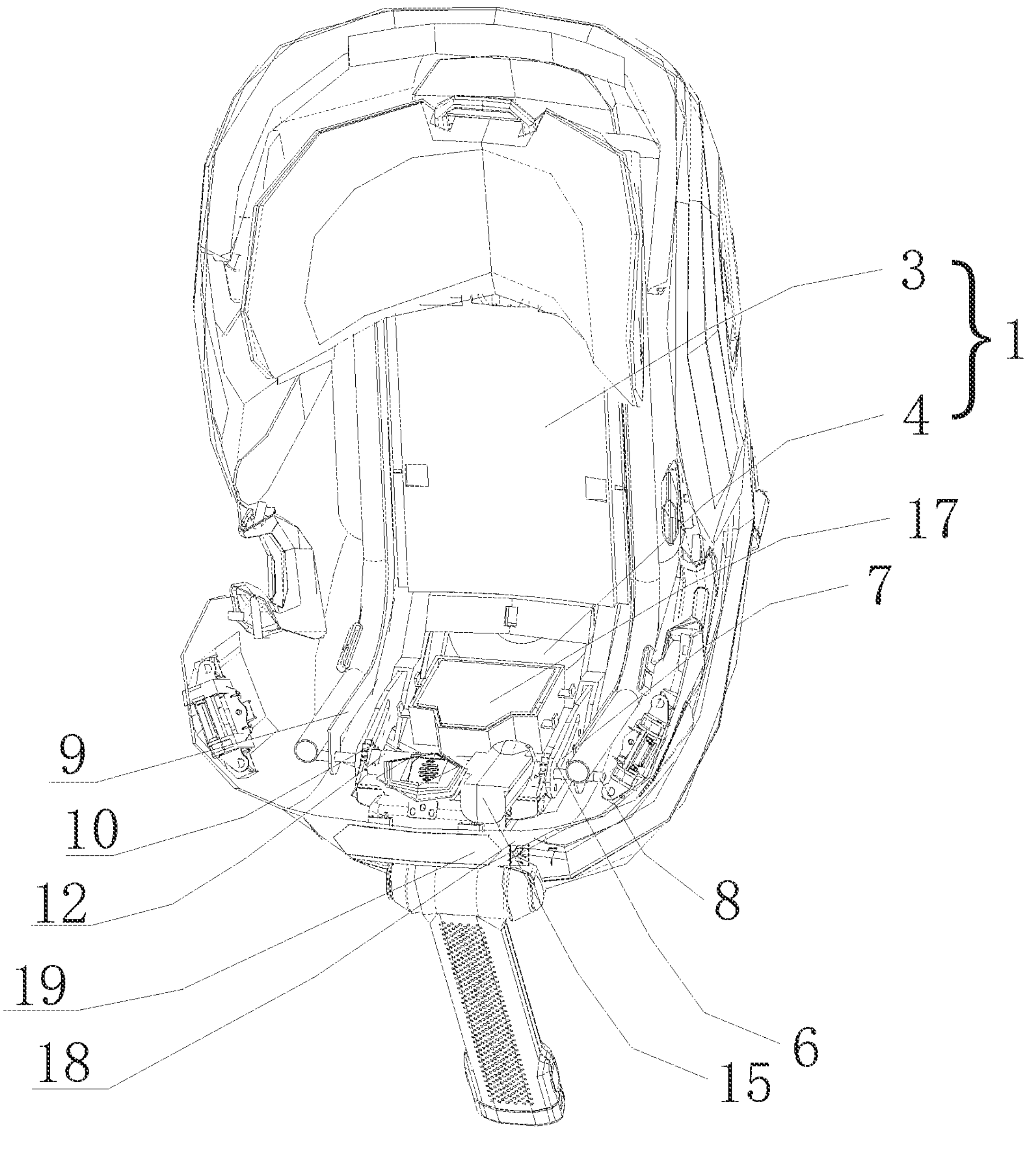
FIG. 6 is a schematic structural diagram of a child safety seat according to the present disclosure.
Figure 7:
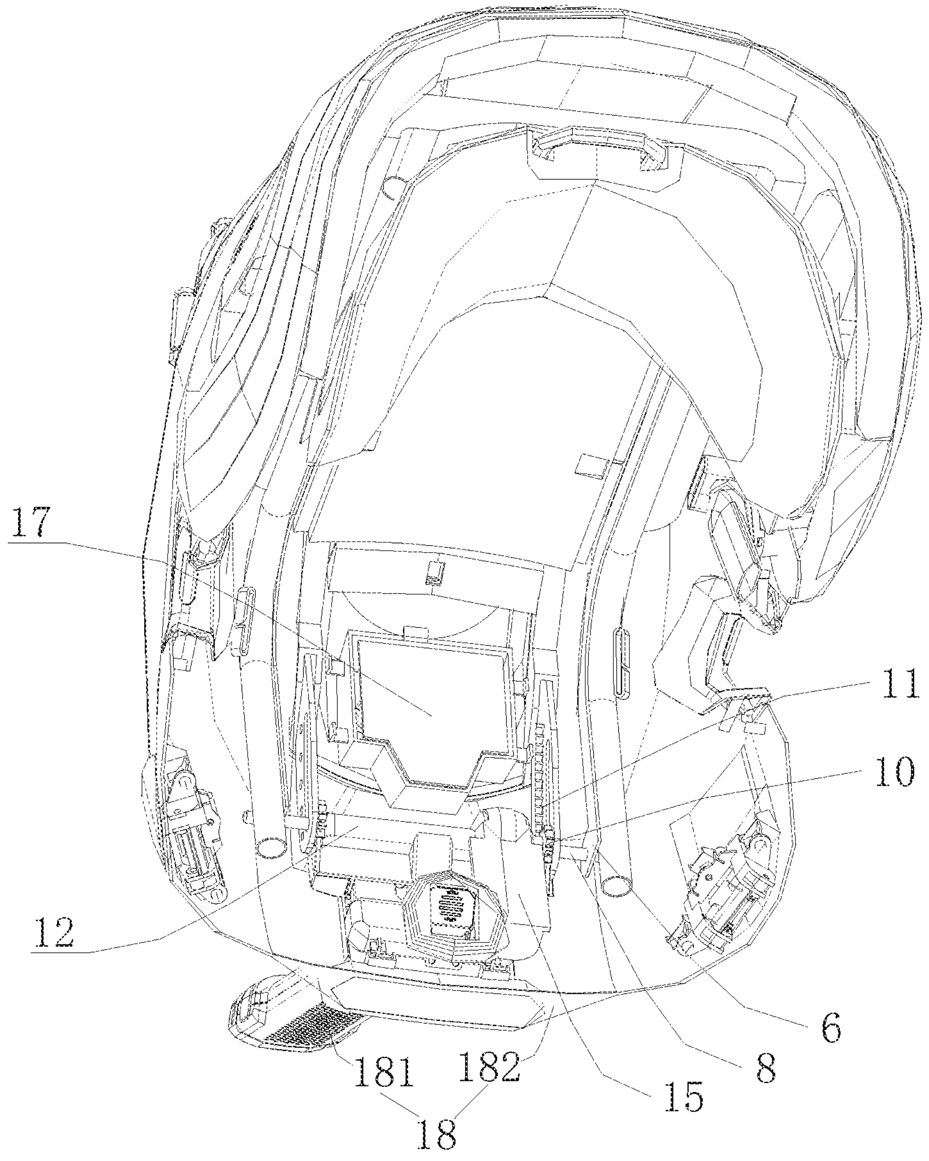
FIG. 7 is a schematic structural diagram of a seat body in the present disclosure.

As shown in FIG. 6 and FIG. 7, this embodiment provides a child safety seat based on Embodiment 2. The seat body 1 is provided with a sensing device 17. The sensing device 17 is configured to sense an empty state of the seat body 1. The sensing device 17 is a pressure sensor. The pressure sensor is mounted at the seat portion 4. Whether there is a child in the seat body 1 by sensing a change in pressure on the seat portion 4.

Further, in this embodiment, the protective device 18 is a pressure sensor. One end of the seat body 1 is a headrest portion, and the other end is the leg placement end 19 for placing the legs. The turning protective device 18 is arranged at the leg placement end 19 of the seat body 1. During the turning of the seat body 1, when the legs of a child approach or move away from the leg placement end 19, the leg placement end 19 senses a pressure change. Especially during the adjustment of the pitching angle, a larger elevation angle indicates that the legs are closer to the leg placement end 19 and the pressure sensed by the leg placement end 19 is higher. Moreover, if the legs are closer to a front adult seat, and the seat body 1 continues to turn, the legs are easily pinched. The protective device 18 is arranged at the leg placement end 19. When sensing that the pressure reaches the set value, the protective device is triggered to control the seat body 1 to stop turning. Two pressure sensors are arranged at the leg placement end 19 at an interval, which enlarges a sensing area and improves the sensing precision.

And/or, this embodiment can further provide a protective device 18 which is a current sensor. During turning of the seat body 1, the center of gravity and the force on the seat body continuously change, and the force exerted by the driving mechanism of the angle adjustment device to the seat body 1 also continuously changes, so that the protective mechanism determines, through a current change of the driving mechanism, whether it is safe if the seat body 1 continues to turn. When the change in the current reaches a set value, the protective device 18 is triggered to control the seat body 1 to no longer turn, which ensures the safety of a child sitting in the safety seat.

The present disclosure provides a child safety seat. The pitching angle adjustment of the child safety seat is achieved through the angle adjustment mechanism. The connecting rod 8 is connected to the seat frame 9, and the shaft sleeve 12 sleeving the connecting rod 8 is driven by the motor. The gears 10 are mounted at the two ends of the shaft sleeve 12, and the gears 10 are driven by the shaft sleeve 12 to move on the rack 11. The rack 11 is mounted on the base plate 5, so that the seat body 1 can adjust the angle on the base plate 5. The connecting rod 8 and the seat frame 9 form the fixed supporting structure, so that the stability of angle adjustment is better. By the arrangement of the protective device 18 on the seat portion, the probability of accidentally injuring a child during the turning of the seat body 1 is reduced, and the safety of use is improved. By the arrangement of the sensing device 17 configured to activate the protective device 18 after detecting that the seat body 1 is not empty, the energy waste caused by empty seat protection is prevented. The child safety seat provided in the present disclosure has the advantages of compact structure, good supportability, and high safety of use.

The terms used in part of the implementations of the present disclosure are only used for explaining the specific embodiments of the present disclosure, but are not intended to limit the present disclosure. The implementation modes of the present disclosure are described above only. It should be noted that those of ordinary skill in the art can further make improvements without departing from the concept of the present disclosure. These improvements shall all fall within the protection scope of the present disclosure.

The invention claimed is:

1. A child safety seat, comprising a seat body, wherein the seat body is provided with an angle adjustment device; the angle adjustment device is configured to electrically adjust a pitching angle of the seat body;

the seat body comprises a seat back portion and a seat portion; the angle adjustment device is arranged on the seat portion; the angle adjustment device comprises a base plate; the base plate is shaped to fit the seat portion; the base plate is configured to support the seat body; the angle adjustment device further comprises a driving mechanism; the driving mechanism is configured to drive the seat body to move on the base plate;

the seat portion is provided with a protective device; the protective device is configured to prevent legs from being pinched; the protective device comprises a sensor and a controller; and during a pitching angle adjustment process, when the sensor detects that the legs are being pinched by the seat body, the controller is triggered to control the angle adjustment device to stop and/or move back.

2. The child safety seat according to claim 1, wherein a connecting plate is arranged on the base plate; the base plate is connected to the seat body through the connecting plate; the seat body is slidably connected to the base plate through the connecting plate; the seat body is provided with a seat frame; the seat frame comprises a connecting rod; the connecting rod is slidably connected to the connecting plate; and the driving mechanism drives the seat body through the seat frame.

3. The child safety seat according to claim 2, wherein a limiting slot is provided on the connecting plate; the driving mechanism comprises a motor; a shaft sleeve is mounted on the connecting rod; gears are arranged at two ends of the shaft sleeve; an output end of the motor is connected to the gears; the base plate is provided with a rack that is matched with the gears; the shaft sleeve is connected to the motor; and the motor drives the shaft sleeve to enable the gears to move on the rack.

4. The child safety seat according to claim 3, wherein positioning slots are provided at end portions of the shaft sleeve; protrusions are arranged on inner walls of the gears; the protrusions cooperate with the positioning slots to limit the gears at two ends of the shaft sleeve; a speed reduction mechanism is arranged between the shaft sleeve and the motor; the speed reduction mechanism is configured to increase a torque; a motor box is further mounted on the shaft sleeve; the motor box is configured to mount the motor and the speed reduction mechanism; a through hole is provided on the motor box; the through hole is shape to fit the shaft sleeve; and the through hole is configured to sleeve the motor box on the shaft sleeve.

5. The child safety seat according to claim 1, wherein the seat body is further provided with a sensing device; the sensing device is configured to sense an empty state of the seat body; and when the sensing device senses that the seat body is not empty, the protective device is activated.

6. The child safety seat according to claim 5, wherein the protective device is arranged at a leg placement end of the seat body; and the protective device is triggered by sensing a change in pressure on the leg placement end.

7. The child safety seat according to claim 5, wherein the protective device is connected to the driving mechanism; and the protective device is triggered by sensing a change in current of the driving mechanism.

8. A child safety seat, comprising a seat body, wherein the seat body is provided with an angle adjustment device; the angle adjustment device is configured to electrically adjust a pitching angle of the seat body; the seat body comprises a seat back portion and a seat portion; the angle adjustment device is arranged at the seat portion;

the angle adjustment device comprises a base plate, a driving mechanism, and gears; the base plate is shaped to fit the seat portion; the base plate is configured to support the seat body;

the base plate is provided with a connecting plate; the seat portion is slidably connected to the base plate through the connecting plate; the seat portion is provided with a seat frame; the seat frame comprises a connecting rod; the connecting rod is fixedly connected to the seat frame; the connecting plate is provided with a limiting slot; the connecting rod slidably cooperates with the limiting slot; the gears are rotationally connected to the connecting rod; the driving mechanism is in driving connection to the gears; the base plate is provided with a rack that cooperates with the gears; and the driving mechanism drives the gears to enable the seat body to slide.

9. The child safety seat according to claim 8, wherein the driving mechanism comprises a motor; the driving mechanism drives the seat body to move on the base plate through the motor; a shaft sleeve is mounted on the connecting rod; the gears are arranged at two ends of the shaft sleeve; and the shaft sleeve is connected to the motor.

10. The child safety seat according to claim 9, wherein positioning slots are provided at end portions of the shaft sleeve; protrusions are arranged on inner walls of the gears; the protrusions cooperate with the positioning slots to limit the gears at two ends of the shaft sleeve; a speed reduction mechanism is arranged between the shaft sleeve and the motor; the speed reduction mechanism is configured to increase a torque; a motor box is further mounted on the shaft sleeve; the motor box is configured to mount the motor and the speed reduction mechanism; a through hole is provided on the motor box; the through hole is adapted to the shaft sleeve; and the through hole is configured to sleeve the motor box on the shaft sleeve.

* * * * *